(12) United States Patent
Dean et al.

(10) Patent No.: US 8,352,452 B2
(45) Date of Patent: *Jan. 8, 2013

(54) METHODS AND APPARATUS FOR EMPLOYING USAGE STATISTICS IN DOCUMENT RETRIEVAL

(75) Inventors: Jeffrey A. Dean, Palo Alto, CA (US); Benedict A. Gomes, Mountain View, CA (US); Krishna Bharat, Palo Alto, CA (US); Georges Harik, Mountain View, CA (US); Monika H. Henzinger, Vienna (AT)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,467

(22) Filed: Mar. 9, 2012

(65) Prior Publication Data

US 2012/0226705 A1 Sep. 6, 2012

Related U.S. Application Data

(63) Continuation of application No. 13/034,000, filed on Feb. 24, 2011, now Pat. No. 8,156,100, which is a continuation of application No. 09/797,754, filed on Mar. 2, 2001, now Pat. No. 8,001,118.

(51) Int. Cl.
*G06F 17/00* (2006.01)
(52) U.S. Cl. ........ 707/706; 707/708; 707/716; 707/721; 707/727; 707/731
(58) Field of Classification Search .................. 707/706, 707/708, 716, 727, 728, 731
See application file for complete search history.

(56) References Cited

U.S. PATENT DOCUMENTS

| | | | |
|---|---|---|---|
| 5,826,261 A * | 10/1998 | Spencer | 1/1 |
| 5,960,383 A | 9/1999 | Fleischer | |
| 6,006,222 A | 12/1999 | Culliss | |
| 6,014,665 A | 1/2000 | Culliss | |
| 6,029,195 A | 2/2000 | Herz | |
| 6,035,294 A | 3/2000 | Fish | |
| 6,078,916 A | 6/2000 | Culliss | |
| 6,182,067 B1 | 1/2001 | Presnell et al. | |
| 6,272,507 B1 * | 8/2001 | Pirolli et al. | 715/206 |
| 6,285,999 B1 * | 9/2001 | Page | 1/1 |
| 6,311,214 B1 * | 10/2001 | Rhoads | 709/217 |
| 6,360,215 B1 | 3/2002 | Judd et al. | |
| 6,405,175 B1 * | 6/2002 | Ng | 705/14.26 |
| 6,473,752 B1 | 10/2002 | Fleming | |
| 6,480,837 B1 | 11/2002 | Dutta | |
| 6,732,088 B1 | 5/2004 | Glance | |
| 7,062,561 B1 | 6/2006 | Reisman | |
| 7,085,820 B1 | 8/2006 | Nickerson et al. | |
| 2002/0078045 A1 | 6/2002 | Dutta | |

OTHER PUBLICATIONS

The Direct Hit Popularity Engine Technology a White Paper. [online]. [retrieved on Apr. 2, 2009], Retrieved from the Internet URL:http://www.uni-koblenz.de/FB4/Institutes/ICV/AGKrause/Teachings/SS07/DirectHit.pdf, 5 pages.

* cited by examiner

*Primary Examiner* — Sana Al Hashemi
(74) *Attorney, Agent, or Firm* — Fish & Richardson P.C.

(57) ABSTRACT

Methods and apparatus consistent with the invention provide improved organization of documents responsive to a search query. In one embodiment, a search query is received and a list of responsive documents is identified. The responsive documents are organized based in whole or in part on usage statistics.

20 Claims, 6 Drawing Sheets

METHODS AND APPARATUS FOR EMPLOYING USAGE STATISTICS IN DOCUMENT RETRIEVAL

CROSS REFERENCE TO RELATED APPLICATIONS

This application is a continuation application of, and claims priority to, U.S. patent application Ser. No. 13/034,000, entitled "Methods and Apparatus for Employing Usage Statistics in Document Retrieval," which was filed on Feb. 24, 2011; which is a continuation of U.S. patent application Ser. No. 09/797,754, entitled "Methods and Apparatus for Employing Usage Statistics in Document Retrieval," which was filed on Mar. 2, 2001. The disclosure of each of these applications is incorporated herein by reference in their entirety.

BACKGROUND OF THE INVENTION

A. Field of the Invention

The present invention relates generally to information search and retrieval and, more particularly, to employing usage data to improve information search and retrieval.

B. Description of Related Art

The World Wide Web ("web") contains a vast amount of information. Locating a desired portion of the information, however, can be challenging. This problem is compounded because the amount of information on the web and the number of new users inexperienced at web research are growing rapidly.

People generally surf the web based on its link graph structure, often starting with high quality human-maintained indices or search engines. Human-maintained lists cover popular topics effectively but are subjective, expensive to build and maintain, slow to improve, and do not cover all esoteric topics.

Automated search engines, in contrast, locate web sites by matching search terms entered by the user to an indexed corpus of web pages. Generally, the search engine returns a list of web sites sorted based on relevance to the user's search terms. Determining the correct relevance, or importance, of a web page to a user, however, can be a difficult task. For one thing, the importance of a web page to the user is inherently subjective and depends on the user's interests, knowledge, and attitudes. There is, however, much that can be determined objectively about the relative importance of a web page.

Conventional methods of determining relevance are based on matching a user's search terms to terms indexed from web pages. More advanced techniques determine the importance of a web page based on more than the content of the web page. For example, one known method, described in the article entitled "The Anatomy of a Large-Scale Hypertextual Search Engine," by Sergey Brin and Lawrence Page, assigns a degree of importance to a web page based on the link structure of the web page.

Each of these conventional methods has shortcomings, however. Term-based methods are biased towards pages whose content or display is carefully chosen towards the given term-based method. Thus, they can be easily manipulated by the designers of the web page. Link-based methods have the problem that relatively new pages have usually fewer hyperlinks pointing to them than older pages, which tends to give a lower score to newer pages.

There exists, therefore, a need to develop other techniques for determining the importance of documents.

SUMMARY OF THE INVENTION

Systems and methods consistent with the present invention address this and other needs by identifying compounds based on the overall context of a user query. One aspect of the present invention is directed to a method of organizing a set of documents by receiving a search query and identifying a plurality of documents responsive to the search query. Each identified document is assigned a score based on usage information, and the documents are organized based on the assigned scores.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

A. Overview

In one embodiment, a search query is received and a list of responsive documents is identified. The list of responsive documents may be based on a comparison between the search query and the contents of the documents, or by other conventional methods. Usage statistics are determined for each document, and the documents are organized based in whole or in part on the usage statistics. These usage statistics may include, for example, the number of visitors to the document (perhaps over a period of time), the frequency with which the document was visited (perhaps over a period of time), or other measures.

A. Architecture

Figure 1:
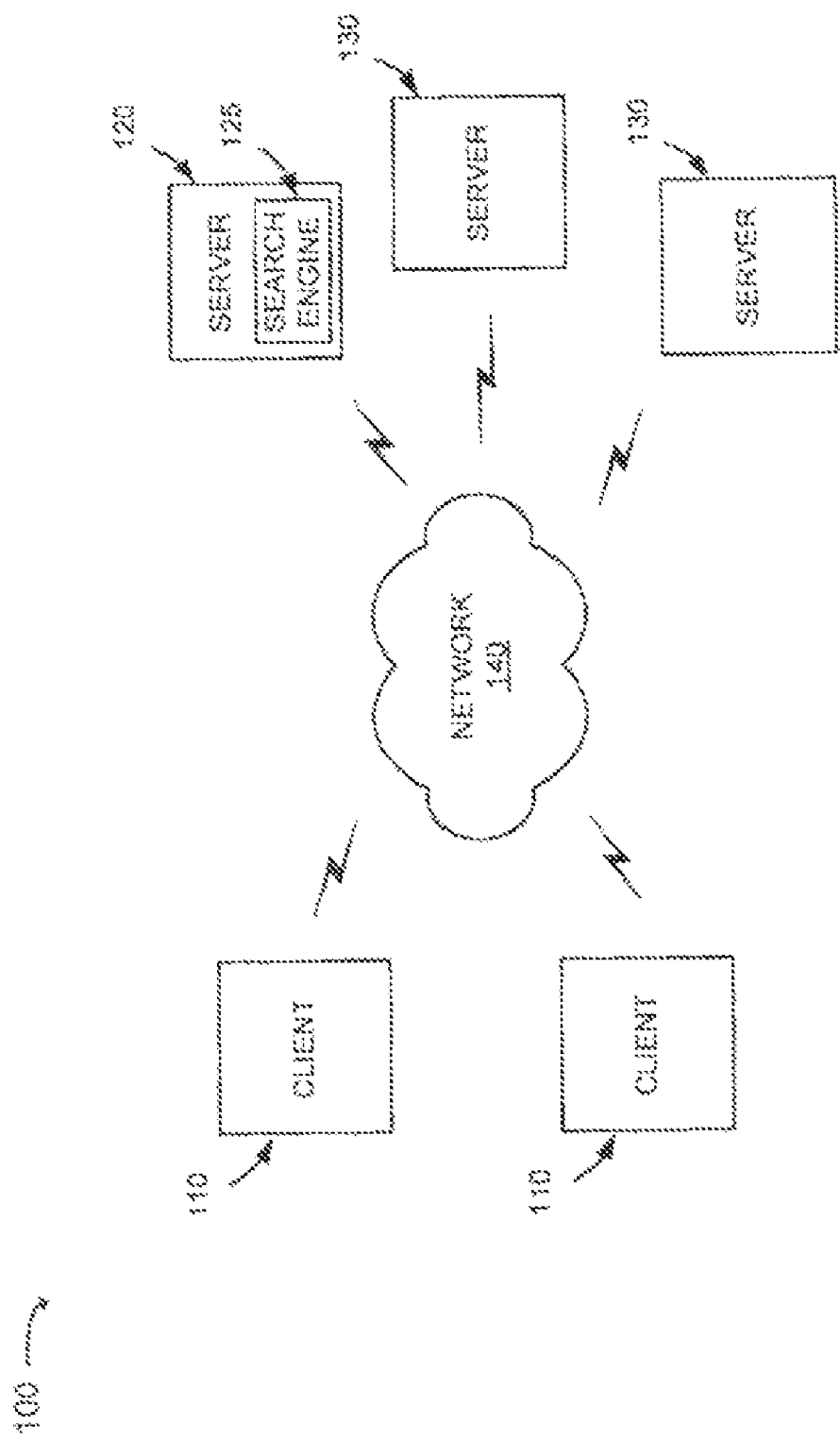
FIG. 1 is a diagram illustrating an exemplary network in which concepts consistent with the present invention may be implemented.

FIG. 1 illustrates a system 100 in which methods and apparatus, consistent with the present invention, may be implemented. The system 100 may include multiple client devices 110 connected to multiple servers 120 and 130 via a network 140. The network 140 may include a local area network (LAN), a wide area network (WAN), a telephone network, such as the Public Switched Telephone Network (PSTN), an intranet, the Internet, or a combination of networks. Two client devices 110 and three servers 120 and 130 have been illustrated as connected to network 140 for simplicity. In practice, there may be more or less client devices and servers. Also, in some instances, a client device may perform the functions of a server and a server may perform the functions of a client device.

The client devices 110 may include devices, such as mainframes, minicomputers, personal computers, laptops, personal digital assistants, or the like, capable of connecting to the network 140. The client devices 110 may transmit data over the network 140 or receive data from the network 140 via a wired, wireless, or optical connection.

Figure 2:
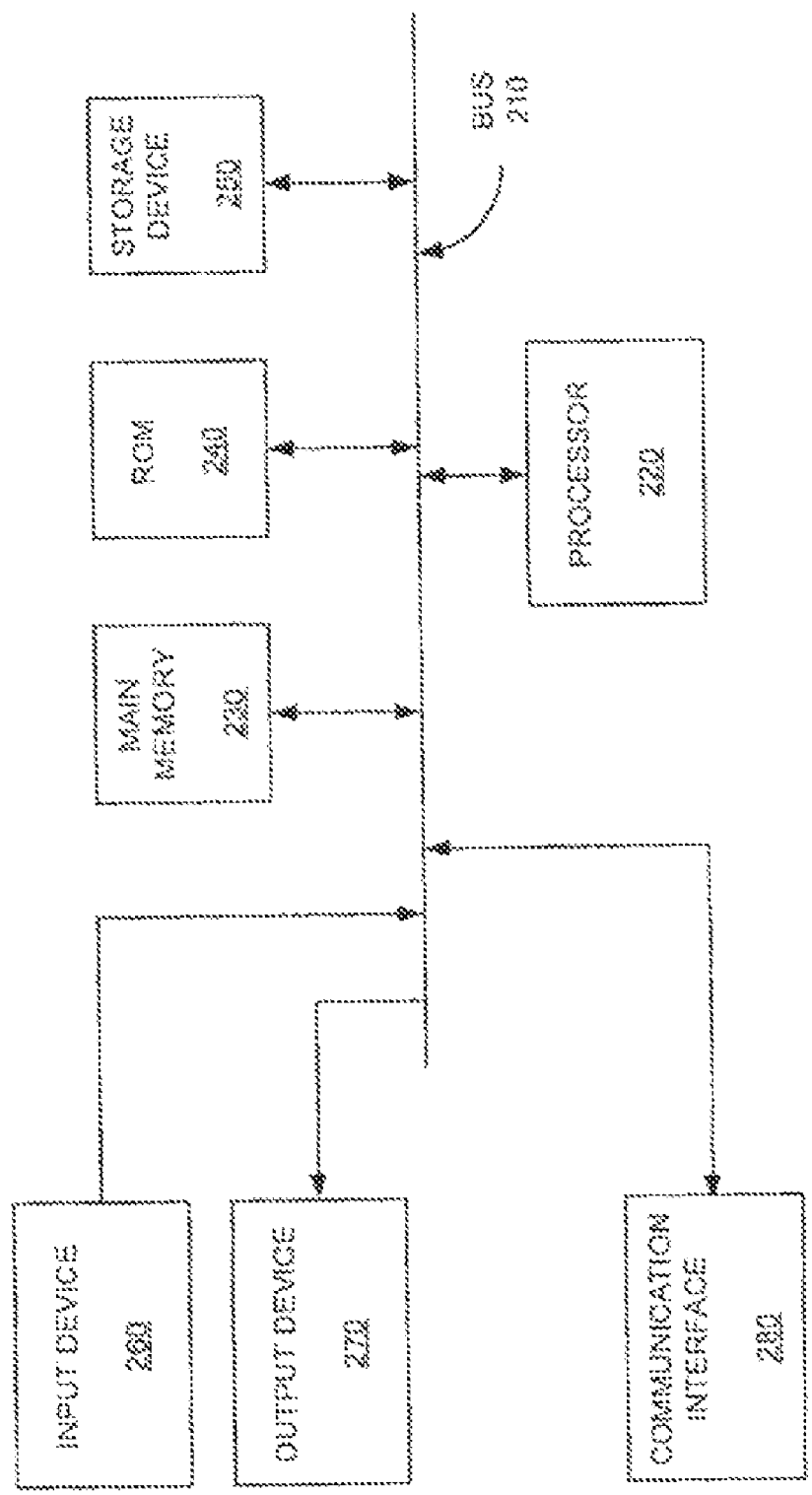
FIG. 2 illustrates an exemplary client device consistent with the present invention.

FIG. 2 illustrates an exemplary client device 110 consistent with the present invention. The client device 110 may include a bus 210, a processor 220, a main memory 230, a read only memory (ROM) 240, a storage device 250, an input device 260, an output device 270, and a communication interface 280.

The bus 210 may include one or more conventional buses that permit communication among the components of the client device 110. The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include one or more conventional mechanisms that permit a user to input information to the client device 110, such as a keyboard, a mouse, a pen, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 110 to communicate with other devices and/or systems. For example, the communication interface 280 may include mechanisms for communicating with another device or system via a network, such as network 140.

As will be described in detail below, the client devices 110, consistent with the present invention, may perform certain document retrieval operations. The client devices 110 may perform these operations in response to processor 220 executing software instructions contained in a computer-readable medium, such as memory 230. A computer-readable medium may be defined as one or more memory devices. The software instructions may be read into memory 230 from another computer-readable medium, such as the data storage device 250, or from another device via the communication interface 280. The software instructions contained in memory 230 cause processor 220 to perform search-related activities described below. Alternatively, hardwired circuitry may be used in place of or in combination with software instructions to implement processes consistent with the present invention. Thus, the present invention is not limited to any specific combination of hardware circuitry and software.

The servers 120 and 130 may include one or more types of computer systems, such as a mainframe, minicomputer, or personal computer, capable of connecting to the network 140 to enable servers 120 and 130 to communicate with the client devices 110. In alternative implementations, the servers 120 and 130 may include mechanisms for directly connecting to one or more client devices 110. The servers 120 and 130 may transmit data over network 140 or receive data from the network 140 via a wired, wireless, or optical connection.

The servers may be configured in a manner similar to that described above in reference to FIG. 2 for client device 110. In an implementation consistent with the present invention, the server 120 may include a search engine 125 usable by the client devices 110. The servers 130 may store documents (or web pages) accessible by the client devices 110 and may perform document retrieval and organization operations, as described below.

B. Architectural Operation

Figure 3:
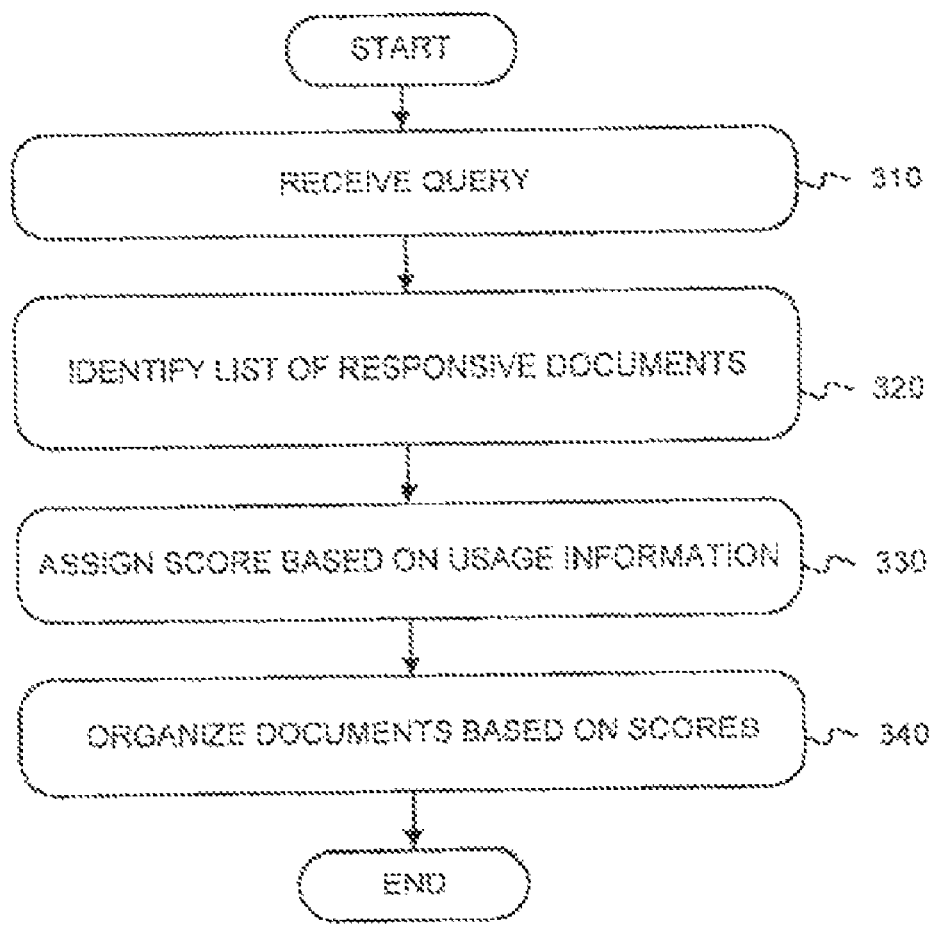
FIG. 3 illustrates a flow chart describing the computation of usage data.

FIG. 3 illustrates a flow diagram, consistent with the invention, for organizing documents based on usage information. At stage 310, a search query is received by search engine 125. The query may contain text, audio, video, or graphical information. At stage 320, search engine 125 identifies a list of documents that are responsive (or relevant) to the search query. This identification of responsive documents may be performed in a variety of ways, consistent with the invention, including conventional ways such as comparing the search query to the content of the document.

Once this set of responsive documents has been determined, it is necessary to organize the documents in some manner. Consistent with the invention, this may be achieved by employing usage statistics, in whole or in part.

As shown at stage 330, scores are assigned to each document based on the usage information. The scores may be absolute in value or relative to the scores for other documents. This process of assigning scores, which may occur before or after the set of responsive documents is identified, can be based on a variety of usage information. In a preferred implementation, the usage information comprises both unique visitor information and frequency of visit information, as described below in reference to FIGS. 4 and 5. The usage information may be maintained at client 110 and transmitted to search engine 125. The location of the usage information is not critical, however, and it could also be maintained in other ways. For example, the usage information may be maintained at servers 130, which forward the information to search engine 125; or the usage information may be maintained at server 120 if it provides access to the documents (e.g., as a web proxy).

At stage 340, the responsive documents are organized based on the assigned scores. The documents may be organized based entirely on the scores derived from usage statistics. Alternatively, they may be organized based on the assigned scores in combination with other factors. For example, the documents may be organized based on the assigned scores combined with link information and/or query information. Link information involves the relationships between linked documents, and an example of the use of such link information is described in the Brin & Page publication referenced above. Query information involves the information provided as part of the search query, which may be used in a variety of ways to determine the relevance of a document. Other information, such as the length of the path of a document, could also be used. Other information, such as the length of the path of a document, could also be used.

In one implementation, documents are organized based on a total score that represents the product of a usage score and a standard query-term-based score ("IR score"). In particular, the total score equals the square root of the IR score multiplied by the usage score. The usage score, in turn, equals a frequency of visit score multiplied by a unique user score multiplied by a path length score.

The frequency of visit score equals $\log 2(1+\log(VF)/\log(MAXVF)$. VF is the number of times that the document was visited (or accessed) in one month, and MAXVF is set to 2000. A small value is used when VF is unknown. If the unique user is less than 10, it equals 0.5*UU/10; otherwise, it equals 0.5*(1+UU/MAXUU). UU is the number of unique hosts/IPs that access the document in one month, and MAXUU is set to 400. A small value is used when UU is unknown. The path length score equals log(K−PL)/log(K). PL is the number of '/' characters in the document's path, and K is set to 20.

Figure 4:
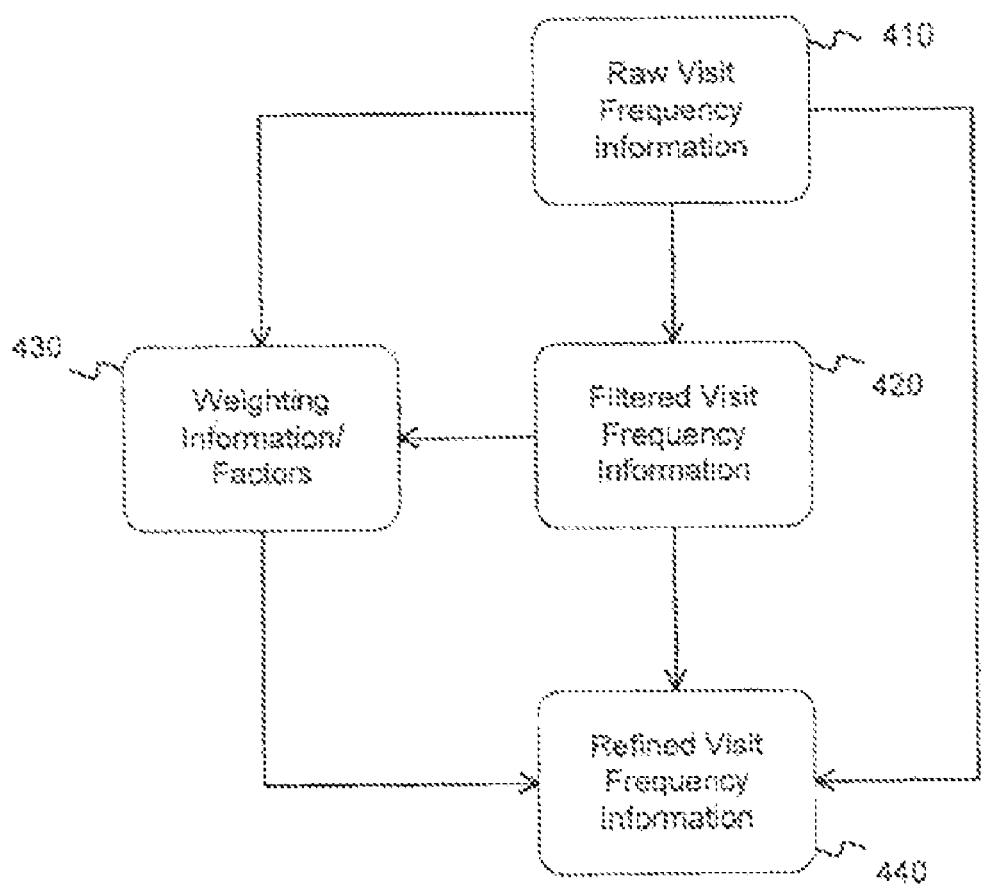
FIG. 4 illustrates a few techniques for computing the frequency of visits, consistent with the invention.

FIG. 4 illustrates a few techniques for computing the frequency of visits, consistent with the invention. The computation begins with a raw count 410, which could be an absolute or relative number corresponding to the visit frequency for the document. For example, the raw count may represent the total number of times that a document has been visited. Alternatively, the raw count may represent the number of times that a document has been visited in a given period of time (e.g., 100 visits over the past week), the change in the number of times that a documents has been visited in a given period of time (e.g., 20% increase during this week compared to the last week), or any number of different ways to measure how frequently a document has been visited. In one implementation, this raw count is used as the refined visit frequency 440, as shown by the path from 410 to 440.

In other implementations, the raw count may be processed using any of a variety of techniques to develop a refined visit frequency, with a few such techniques being illustrated in FIG. 4. As shown by 420, the raw count may be filtered to remove certain visits. For example, one may wish to remove visits by automated agents or by those affiliated with the document at issue, since such visits may be deemed to not represent objective usage. This filtered count 420 may then be used to calculate the refined visit frequency 440.

Instead of, or in addition to, filtering the raw count, the raw count may be weighted based on the nature of the visit (430). For example, one may wish to assign a weighting factor to a visit based on the geographic source for the visit (e.g., counting a visit from Germany as twice as important as a visit from Antarctica). Any other type of information that can be derived about the nature of the visit (e.g., the browser being used, information concerning the user, etc.) could also be used to weight the visit. This weighted visit frequency 430 may then be used as the refined visit frequency 440.

Although only a few techniques for computing the visit frequency are illustrated in FIG. 4, those skilled in the art will recognize that there exist other ways for computing the visit frequency, consistent with the invention.

Figure 5:
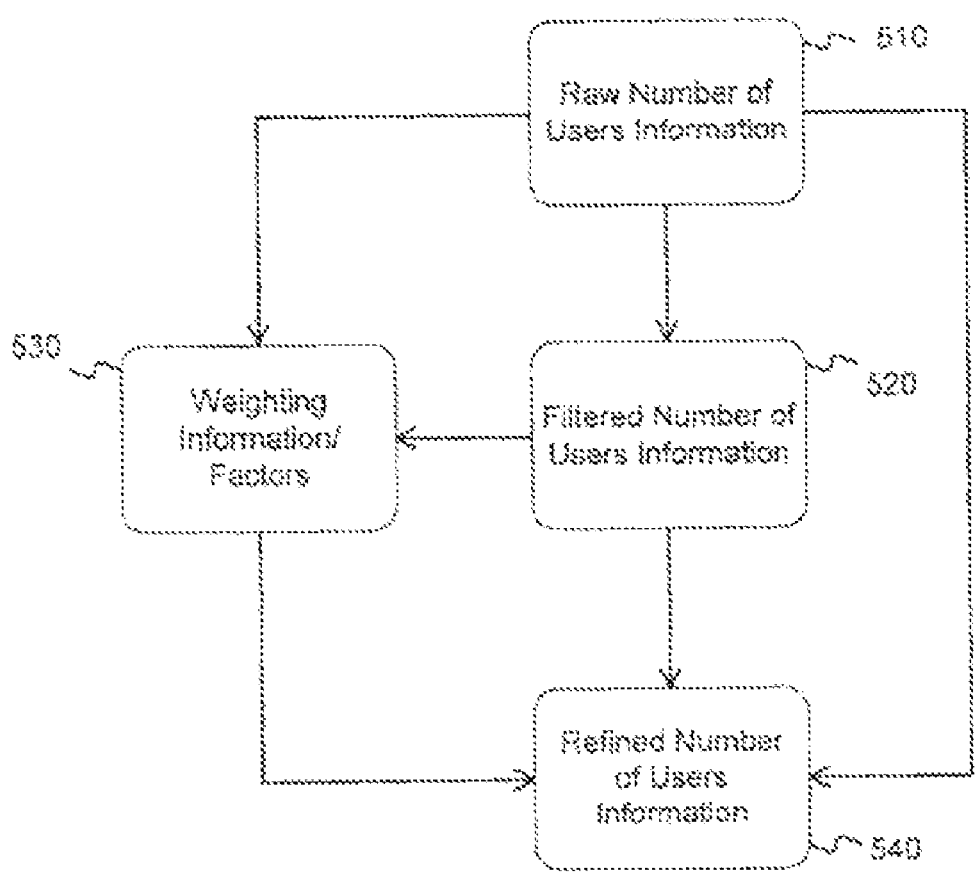
FIG. 5 illustrates a few techniques for computing the number of users, consistent with the invention.

FIG. 5 illustrates a few techniques for computing the number of users, consistent with the invention. As with the techniques for computing visit frequency illustrated in FIG. 4, the computation begins with a raw count 510, which could be an absolute or relative number corresponding to the number of users who have visited the document. Alternatively, the raw count may represent the number of users that have visited a document in a given period of time (e.g., 30 users over the past week), the change in the number of users that have visited the document in a given period of time (e.g., 20% increase during this week compared to the last week), or any number of different ways to measure how many users have visited a document. The identification of the users may be achieved based on the user's Internet Protocol (IP) address, their hostname, cookie information, or other user or machine identification information. In one implementation, this raw count is used as the refined number of users 540, as shown by the path from 510 to 540.

In other implementations, the raw count may be processed using any of a variety of techniques to develop a refined user count, with a few such techniques being illustrated in FIG. 5. As shown by 520, the raw count may be filtered to remove certain users. For example, one may wish to remove users identified as automated agents or as users affiliated with the document at issue, since such users may be deemed to not provide objective information about the value of the document. This filtered count 520 may then be used to calculate the refined user count 540.

Instead of, or in addition to, filtering the raw count, the raw count may be weighted based on the nature of the user (530). For example, one may wish to assign a weighting factor to a visit based on the geographic source for the visit (e.g., counting a user from Germany as twice as important as a user from Antarctica). Any other type of information that can be derived about the nature of the user (e.g., browsing history, bookmarked items, etc.) could also be used to weight the user. This weighted user information 530 may then be used as the refined user count 540.

Although only a few techniques for computing the number of users are illustrated in FIG. 5, those skilled in the art will recognize that there exist other ways for computing the number of users, consistent with the invention. Similarly, although FIGS. 4 and 5 illustrate two types of usage information that may be used to organize documents, those skilled in the art will recognize that there exist other such type of information and techniques consistent with the invention.

Furthermore, although FIGS. 4 and 5 illustrate determining usage information on a document-by-document basis, other techniques consistent with the information may be used to associate usage information with a document. For example, rather than maintaining usage information for each document, one could maintain usage information on a site-by-site basis. This site usage information could then be associated with some or all of the documents within that site.

Figure 6:
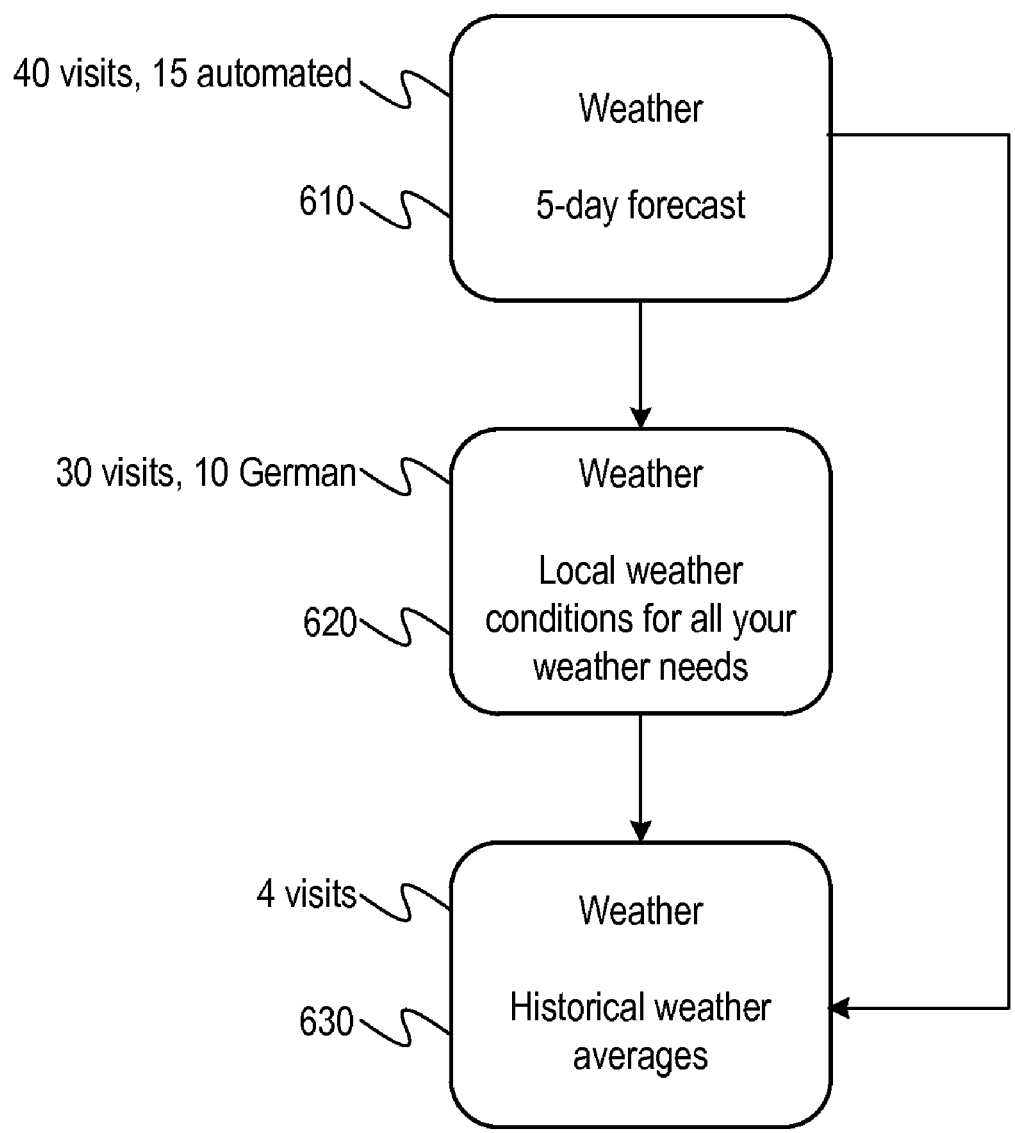
FIG. 6 depicts an exemplary method, consistent with the invention.

FIG. 6 depicts an exemplary method employing visit frequency information, consistent with the invention. FIG. 6 depicts three documents, 610, 620, and 630, which are responsive to a search query for the term "weather." Document 610 is shown to have been visited 40 times over the past month, with 15 of those 40 visits being by automated agents. Document 620, which is linked to from document 610, is shown to have been visited 30 times over the past month, with 10 of those 30 visits coming from Germany. Document 630, which is linked to from documents 610 and 620, is shown to have been visited 4 times over the past month.

Under a conventional term frequency based search method, the documents may be organized based on the frequency with which the search query term ("weather") appears in the document. Accordingly, the documents may be organized into the following order: 620 (three occurrences of "weather"), 630 (two occurrences of "weather"), and 610 (one occurrence of "weather").

Under a conventional link-based search method, the documents may be organized based on the number of other documents that link to those documents. Accordingly, the documents may be organized into the following order: 630 (linked to by two other documents), 620 (linked to by one other document), and 610 (linked to by no other documents).

Methods and apparatus consistent with the invention employ usage information to aid in organizing documents. Based purely on raw visit frequency, the documents may be organized into the following order: 610 (40 visits), 620 (30 visits), and 630 (4 visits). If these raw visit frequency numbers are refined to filter automated agents and to assign double weight to visits from Germany, the documents may be organized in the following order: 620 (effectively 40 visits, since the 10 from Germany count double), 610 (effectively 25 visits after filtering the 15 visits from automated agents), and 630 (effectively 4 visits).

Instead of using the usage information alone, the usage information may be used in combination with the query information and/or the link information to develop the ultimate organization of the documents.

C. Conclusion

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the preceding description generally discussed the operation of search engine 125 in the context of a search of documents on the world wide web, search engine 125 could be implemented on any corpus.

The scope of the invention is defined by the claims and their equivalents.

What is claimed:

1. A computer-implemented method, comprising:
   receiving, by a computer, data identifying a plurality of documents determined to be responsive to a search query, the data including a first score for each document that is based on one or more of link information and query information, the link information describing a link relationship between the document and other documents, and the query information describing the relevance of document to the query;
   accessing, by the computer, usage information associated with the plurality of documents, the usage information including, for each document, a frequency of visit value based on a number of times the document was visited during a time period and a separate visit value based on a number of separate visitors to the document;
   determining, by the computer, for each document, a usage score from the frequency of visit value and the separate visit value associated with the document; and
   determining, by the computer and for each document, a total score for the document that is based on the usage score for the document and the first score for each document; and
   determining, by the computer, an organization for the documents based on the total scores for the documents.

2. The computer-implemented method of claim 1, further comprising:
   determining, by the computer, for each document, a path length score from a path of the document;
   wherein determining the usage score from the frequency of visit value and the separate visit value associated with the document comprises determining the usage score from the frequency of visit value and the separate visit value associated with the document and the path length score of the document.

3. The computer-implemented method of claim 1, wherein determining the usage score from the frequency of visit value and the separate visit value associated with the document comprises:
   determining a frequency of visit score based on the frequency of visit value and a maximum frequency of visit value;
   determining a separate user score based on the separate visit value and a maximum separate visit value; and
   determining the usage score from the frequency of visit score and the separate user score.

4. The computer-implemented method of claim 3, wherein:
   determining the frequency of visit score based on the frequency of visit value and the maximum frequency of visit value comprises determining the frequency of visit score based on a log ratio of the frequency of visit value to the maximum frequency of visit value; and
   determining the separate user score based on the separate visit value and the maximum separate visit value comprises determining the separate user score based on a ratio of the separate visit value to the maximum separate visit value.

5. The computer-implemented method of claim 1, wherein, for each document:
   the frequency of visit value is equal to the number of times the document was visited during the time period; and
   the separate visit value is equal to the number of separate visitors to the document during the time period.

6. The computer-implemented method of claim 1, wherein, for each document, the frequency of visit value is equal to a percentage change based on the number times the document was visited during the time period and the number of times the document was visited during a previous time period.

7. The computer-implemented method of claim 1, wherein, for each document, the separate visit value is equal to a percentage change based on the number of separate visitors to the document during the time period and a number of separate visitors to the document during a previous time period.

8. The computer-implemented method of claim 1, wherein, for each document, the frequency of visit value is based on weighted visit counts, each visit count weighted based on a geographic location that is the geographic source of the visit.

9. An apparatus, comprising:
   memory hardware storing program instructions; and
   one or more processors in data communication with the memory hardware and configured to execute the program instructions, and upon execution the program instructions cause the one or more processors to perform operations comprising:
   receiving data identifying a plurality of documents determined to be responsive to a search query, the data including a first score for each document that is based on one or more of link information and query information, the link information describing a link relationship between the document and other documents, and the query information describing the relevance of document to the query;
   accessing usage information associated with the plurality of documents, the usage information including, for each document, a frequency of visit value based on a number of times the document was visited during a time period and a separate visit value based on a number of separate visitors to the document;
   determining, for each document, a usage score from the frequency of visit value and the separate visit value associated with the document; and
   determining, for each document, a total score for the document that is based on the usage score for the document and the first score for each document; and
   determining an organization for the documents based on the total scores for the documents.

10. The apparatus of claim 9, wherein the operations further comprise:
    determining for each document, a path length score from a path of the document;
    wherein determining the usage score from the frequency of visit value and the separate visit value associated with the document comprises determining the usage score from the frequency of visit value and the separate visit value associated with the document and the path length score of the document.

11. The apparatus of claim 9, wherein determining the usage score from the frequency of visit value and the separate visit value associated with the document comprises:
  determining a frequency of visit score based on the frequency of visit value and a maximum frequency of visit value;
  determining a separate user score based on the separate visit value and a maximum separate visit value; and
  determining the usage score from the frequency of visit score and the separate user score.

12. The apparatus of claim 11, wherein:
  determining the frequency of visit score based on the frequency of visit value and the maximum frequency of visit value comprises determining the frequency of visit score based on a log ratio of the frequency of visit value to the maximum frequency of visit value; and
  determining the separate user score based on the separate visit value and the maximum separate visit value comprises determining the separate user score based on a ratio of the separate visit value to the maximum separate visit value.

13. The apparatus of claim 9, wherein, for each document:
  the frequency of visit value is equal to the number of times the document was visited during the time period; and
  the separate visit value is equal to the number of separate visitors to the document during the time period.

14. The apparatus of claim 9, wherein, for each document, the frequency of visit value is equal to a percentage change based on the number times the document was visited during the time period and the number of times the document was visited during a previous time period.

15. The apparatus of claim 9, wherein, for each document, the separate visit value is equal to a percentage change based on the number of separate visitors to the document during the time period and a number of separate visitors to the document during a previous time period.

16. The apparatus of claim 9, wherein for each document, the frequency of visit value is based on weighted visit counts, each visit count weighted based on a geographic location that is the geographic source of the visit.

17. Software stored in a computer readable storage device and comprising instructions executable by a data processing apparatus and upon such execution cause the data processing apparatus to perform operations comprising:
  receiving data identifying a plurality of documents determined to be responsive to a search query, the data including a first score for each document that is based on one or more of link information and query information, the link information describing a link relationship between the document and other documents, and the query information describing the relevance of document to the query;
  accessing usage information associated with the plurality of documents, the usage information including, for each document, a frequency of visit value based on a number of times the document was visited during a time period and a separate visit value based on a number of separate visitors to the document;
  determining, for each document, a usage score from the frequency of visit value and the separate visit value associated with the document; and
  determining, for each document, a total score for the document that is based on the usage score for the document and the first score for each document; and
  determining an organization for the documents based on the total scores for the documents.

18. The software of claim 17, wherein the operations further comprise:
  determining for each document, a path length score from a path of the document;
  wherein determining the usage score from the frequency of visit value and the separate visit value associated with the document comprises determining the usage score from the frequency of visit value and the separate visit value associated with the document and the path length score of the document.

19. The software of claim 17, wherein determining the usage score from the frequency of visit value and the separate visit value associated with the document comprises:
  determining a frequency of visit score based on the frequency of visit value and a maximum frequency of visit value;
  determining a separate user score based on the separate visit value and a maximum separate visit value; and
  determining the usage score from the frequency of visit score and the separate user score.

20. The software of claim 17, wherein, for each document, the separate visit value is equal to a percentage change based on the number of separate visitors to the document during the time period and a number of separate visitors to the document during a previous time period.

* * * * *

UNITED STATES PATENT AND TRADEMARK OFFICE
CERTIFICATE OF CORRECTION

PATENT NO. : 8,352,452 B2
APPLICATION NO. : 13/416467
DATED : January 8, 2013
INVENTOR(S) : Jeffrey A. Dean et al.

It is certified that error appears in the above-identified patent and that said Letters Patent is hereby corrected as shown below:

Claim 6, Column 8, Line 17 – delete "number times" and insert -- number of times --, therefor.

Claim 14, Column 9, Line 29 – delete "number times" and insert -- number of times --, therefor.

Signed and Sealed this
Second Day of April, 2013

Teresa Stanek Rea
*Acting Director of the United States Patent and Trademark Office*